United States Patent
Nishioka et al.

(10) Patent No.: US 7,220,797 B2
(45) Date of Patent: May 22, 2007

(54) METHOD OF PRODUCING COPOLYMER LATEX USING FOR AQUEOUS PAINT

(75) Inventors: Toshiyasu Nishioka, Konohana-ku (JP); Akira Kamimura, Konohana-ku (JP); Makoto Itagaki, Niihama (JP)

(73) Assignee: Nippon A&L Incorporated, Osaka (JP)

( * ) Notice: Subject to any disclaimer, the term of this patent is extended or adjusted under 35 U.S.C. 154(b) by 445 days.

(21) Appl. No.: 10/909,375

(22) Filed: Aug. 3, 2004

(65) Prior Publication Data

US 2005/0043477 A1 Feb. 24, 2005

(30) Foreign Application Priority Data

Aug. 4, 2003 (JP) ............................. 2003-205792

(51) Int. Cl.
  *C08L 45/00* (2006.01)
(52) U.S. Cl. ................. 524/700; 524/828; 524/575; 524/832; 524/833
(58) Field of Classification Search ........... 524/700, 524/828, 575, 832, 833
  See application file for complete search history.

(56) References Cited

U.S. PATENT DOCUMENTS 4,515,914 A * 5/1985 Tsurumi et al. ............. 523/201
4,613,650 A * 9/1986 Sekiya et al. ............... 524/828
5,444,118 A * 8/1995 Tsuruoka et al. ........... 524/828

FOREIGN PATENT DOCUMENTS

JP   04359001 A   * 12/1992
JP   10182709 A   *  7/1998

* cited by examiner

*Primary Examiner*—Ling-Sui Choi
*Assistant Examiner*—Satya B. Sastri

(57) ABSTRACT

A copolymer latex for chipping-resistant aqueous paint capable of remarkably improving balance of chipping-resistance, strength of adherence with metal, water-resistance and high resistance for cycles of cool and heat is provided.

This is achieved by a method for producing a copolymer latex using for chipping-resistant aqueous paint, the method comprising emulsion-polymerizing 20 to 80 parts by weight of a conjugated diene as a monomer, 0.5 to 15 parts by weight of an ethylenically unsaturated carboxylic acid as a monomer, 5 to 40 parts by weight of an aromatic vinyl compound as a monomer, 5 to 40 parts by weight of an unsaturated alkyl carboxylate as a monomer and optionally not more than 69.5 parts by weight of other compound having vinyl group copolymerizable therewith as a monomer based on 100 parts by weight in the total of the monomers, wherein 100 wt % of the amount of conjugated diene, 100 wt % of the amount of ethylenically unsaturated carboxylic acid, 95 to 50 wt % of the amount of aromatic vinyl compound and 95 to 50 wt % of the amount of the unsaturated alkyl carboxylate are added in the former stage of the emulsion-polymerization, and 5 to 50 wt % of the amount of the aromatic vinyl compound and 5 to 50 wt % of the amount of the unsaturated alkyl carboxylate are added at the later stage of emulsion-polymerization.

2 Claims, No Drawings

METHOD OF PRODUCING COPOLYMER LATEX USING FOR AQUEOUS PAINT

FIELD OF THE INVENTION

The present invention relates to a copolymer latex using for an aqueous paint which is coated on the surface of metalic parts to protect the metalic parts from chipping. More particularly, the present invention relates to a copolymer latex using for aqueous paint covering, for example, the surf ace of parts such as rear parts of the floor of an automobile body to which stones easily hit during running.

On rear parts of the floor of an automobile body, materials of bitumen are conventionally used as a protective due to high resistance to rust and low cost, however, crack or scratch was made on the protective by hit of pebbles or stones during running of an automobile and corrosion is generated by adhesion of water, an anti-freezing agent particularly in cold districts or salts around coast to the crack or scratch. For preventing such phenomenon, a so-called chipping-resistant paint has been developed and used. As such a chipping-resistant paint, paints composed of emulsion, vinyl chloride resin plastisol, urethane or polyesters and the like, and improved bituminous products have been developed.

On the other hand, recently, in the field of adhesion and paints, in order to suppress environmental pollution in air, possibility of fire, and in order to improve hygienic in working, and energy saving and resource sawing, solvent is shifted to aqueous solvent from organic solvent, and such shift is also required for a chipping-resistant paint used in an automobile and its primer.

It is important for a chipping-resistant paint to have a higher strength of adherence between a coated layer of the point and metal as base substrate in addition to excellent chipping-resistance of the paint, because of protecting the metal. Since a chipping-resistant paint is often applied to a part which is splashed by water such as the outer surface of the floor of an automobile and the like, the water-resistance of the coated layer is also important in addition to adherence.

Further, regarding the above-mentioned strength of adherence, since It Is desired that a coated layer of paint stably protects the metal as base substrate even under environment of repetition of coldness and heat, and sufficient resistance for cycles of cold and heat is required.

There are suggested copolymer latexes used for a chipping-resistant paint in, for example, JP Nos. 10-226735 A, 6-207135 A, 6-207136 A, 2000-178497 A, 2003-138198 A and 2003-138199 A, respectively. However, recently, requirements for various abilities of chipping-resistance pains are becoming further stricter, and copolymer latexes used in these paint are required to be further improved.

SUMMARY OF THE INVENTION

An object of the present invention is to provide a copolymer latex useful for chipping-resistant aqueous paint capable of remarkably improving balance of chipping-resistance, high strength of adherence with metal, higher water-resistance and higher resistance for cycles of cold and heat.

Namely, the present invention provides a method for producing a copolymer latex using for chipping-resistant aqueous paint, the method comprising emulsion-polymerizing 20 to 80 parts by weight of a conjugated diene as a monomer, 0.5 to 15 parts by weight of an ethylenically unsaturated carboxylic acid as a monomer, 5 to 40 parts by weight of an aromatic vinyl compound as a monomer, 5 to 40 parts by weight of an unsaturated alkyl carboxylate as a monomer and optionally not more than 69.5 parts by weight of other compound having vinyl group copolymerizable therewith as a monomer based on 100 parts by weight in the total of the monomers, wherein 100 wt % of the amount of conjugated diene, 100 wt % of the amount of ethylenically unsaturated carboxylic acid, 95 to 50 wt % of the amount of aromatic vinyl compound and 95 to 50 wt % of the amount of the unsaturated alkyl carboxylate are added in the former stage of the emulsion-polymerization, and 5 to 50 wt % of the amount of the aromatic vinyl compound and 5 to 50 wt % of the amount of the unsaturated alkyl carboxylate are added at the later stage of emulsion-polymerization.

DETAILED DESCRIPTION OF PREFERRED EMBODIMENTS

A copolymer in the present invention comprises a repeating unit derived from a conjugated diene, a repeating unit derived from ethylenically unsaturated carboxylic acid, a repeating unit derived from aromatic vinyl compound, a repeating unit derived from unsaturated alkyl carboxylate and optionally a repeating unit derived from other compound having vinyl group copolymerizable therewith.

The conjugated diene includes 1,3-butadiene, 2-methyl-1,3-butadiene, 2,3-dimethyl-1,3-butadiene, 2-chloro-1,3-butadiene, substituted straight-chain-conjugated pentadienes, substituted side-chain-conjugated hexadienes and the like and one or more of them may be used. Particularly, 1,3-butadiene is preferable.

The ethylenically unsaturated carboxylic acid includes acrylic acid, methacrylic acid, crotonic acid, fumaric acid, itaconic acid, maleic acid and the like, and one or more of them may be used.

The aromatic vinyl compound includes styrene, α-methylstyrene, methyl-α-methylstyrene, vinyltoluene and divinylbenzene and the like, and one or more of them may be used. In particular, styrene is preferable.

The unsaturated alkyl carboxylate includes methyl acrylate, methyl methacrylate, ethyl acrylate, ethyl methacrylate, butyl acrylate, glycidyl methacrylate, dimethyl fumarate, diethyl fumarate, dimethyl maleate, diethyl maleate, dimethyl itaconate, monomethyl fumarate, monoethyl fumarate, 2-ethylhexyl acrylate and the like, and one or more of them may be used. In particular, methyl methacrylate Is preferable.

The other compound having vinyl group copolymerizable with above-mentioned compound include unsaturated compounds containing a hydroxyalkyl group, vinyl cyanide, unsaturated carboxylic amide and the like.

The unsaturated compound containing a hydroxyalkyl group includes β-hydroxyethyl acrylate, β-hydroxyethyl methacrylate, hydroxypropyl acrylate, hydroxypropyl methacrylate, hydroxybutyl acrylate, hydroxybutyl methacrylate, 3-chloro-2-hydroxypropyl methacrylate, di-(ethylene glycol) maleate, di-(ethylene glycol) itaconate, 2-hydroxyethyl maleate, bis(2-hydroxyethyl) maleate, 2-hydroxyethyl methyl fumarate and the like, and one or more of them may be used. Particularly, β-hydroxyethyl acrylate is preferable.

The vinyl cyanide includes acrylonitrile, methacrylonitrile α-chloroacrylonitrile, α-ethylacrylonitrile and the like, and one or more of them may be used. Particularly, acrylonitrile is preferable.

The unsaturated carboxylic amide includes acrylamide, methacrylamide, N-methylolacrylamide, N-methylol methacrylamide, N,N-dimethylacrylamide and the like, and one or more of them may be used. Particularly, acrylamide is preferable.

Further, in addition to the above-mentioned compounds, there can be used fatty acid vinyl esters such as vinyl acetate vinyl propionate and the like, basic monomers such as aminoethyl (meth)acrylate, dimethylaminoethyl (meth)acrylate, diethylaminoethyl (meth)acrylate, 2-vinylpyridine, 4-vinylpyridine and the like, vinyl chloride, vinylidene chloride and the like as other compound having vinyl group.

The amount of the above-mentioned compound used for polymerization is 20 to 80 parts by weight of a conjugated diene as a monomer, 0.5 to 15 parts by weight of an ethylenically unsaturated carboxylic acid as a monomer, 5 to 40 parts by weight of an aromatic vinyl compound as a monomer and 5 to 40 parts by weight of an unsaturated alkyl carboxylate as a monomer. If other compound having vinyl group copolymerizable with the above-mentioned compound is further used as an monomer, the amount is not more than 69.5 parts by weight based on 100parts by weight in total amount of added monomers.

If the amount of an aliphatic conjugated diene is less than 20 parts by weight, the chipping-resistance of a paint containing a copolymer latex may decrease, and if over 80 parts by weight, the water resistance of a paint may be lower. Preferably, the amount is from 30 to 70 parts by weight.

If the amount of an ethylenically unsaturated carboxylic acid is less than 0.5 parts by weight, the mechanical strength of a paint containing a copolymer latex may be lower, and if over 15 parts by weight, the viscosity of a latex may increase and may not be easy in handling of a copolymer latex itself. Preferably, this amount is from 1 to 7 parts by weight.

If the amount of an aromatic vinyl compound is less than 5 parts by weight, the chipping-resistance of a paint containing a copolymer latex may be lower, and if over 40 parts by weight, the water resistance of a paint may be lower. Further preferably, this amount is from 5 to 35 parts by weight.

If the amount of an unsaturated alkyl carboxylate is less than 5 parts by weight, the chipping-resistance of a paint containing a copolymer latex may be lower, and if over 40 parts by weight, the water resistance of a paint may be lower. Further preferably, this amount is from 5 to 35 parts by weight.

In the present invention, an aromatic vinyl compound and an unsaturated alkyl carboxylate are added in at least two stages, one is the former stage and the other is the later stage. In the former stage, 95 to 50 wt % of the amount of the aromatic vinyl compound are added in one time, and 95 to 50 wt % of the amount of the unsaturated alkyl carboxylate are added in one time. The aromatic vinyl compound and the unsaturated alkyl carboxylate may be added separately or together, and preferably added together. The polymerization may start before or after completing addition of the aromatic vinyl compound and the unsaturated alkyl carboxylate.

In the former stage, 100 wt % of the amount of a conjugated diene and 100 wt % of the amount of an ethylenically unsaturated carboxylic acid are added. If other compound having vinyl group copolymerizable with above-mentioned compound, 100 wt % of the other compound is added in the first stage.

In the later stage, 5 to 50 wt % of the amount of the aromatic vinyl compound and 5 to 50 wt % of the amount of the unsaturated alkyl carboxylate are added. The aromatic vinyl compound and the unsaturated alkyl carboxylate may be added separately or together. The addition of the aromatic vinyl compound in the later stage may be performed in one time or in two or more times. The addition of the unsaturated alkyl carboxylate in the later stage may be performed in one time or in two or more times.

In the later stage, other monomers than an aromatic vinyl compound and an unsaturated alkyl carboxylate are not added.

By adding these two compounds at the later stage of polymerization, a copolymer latex providing aqueous paint excellent in balance of high strength of adherence with metal, high water-resistance and high resistance for cycles of cold and water is obtained.

The aromatic vinyl compound and the unsaturated alkyl carboxylate are preferably added when the conversion of the total amount of added monomers in the former stage reaches at least 30% or more, and further preferably are added when it reaches 50% or more.

The aromatic vinyl compound and the unsaturated alkyl carboxylate are added before the polymerization is completed.

The method of adding in the present invention Is not particularly restricted, and any of a one-time addition method, divided addition method and continuous addition method can be adopted. Further, in emulsion-polymerization, there can be used chain transfer agents, emulsifiers, polymerization initiators, electrolytes, polymerization promoters, chelating agents and the like generally used.

In the present invention, a chain transfer agent may be used, if necessary. Such a chain transfer agent includes alkylmercaptanes such as n-hexylmercaptane, n-octylmercaptane, t-octylmercaptane, n-dodecylmercaptane, t-dodecylmercaptane, n-stearylmercaptane, xanthogen compounds such as dimethylxanthogen disulfide, diisopropylxanthogen disulfide and the like, α-methylstyrene dimmer, terpinolene, and thiuram compounds such as tetramethylthiuram disulfide, tetraethylthiuram disulfide, tetramethylthiuram monosulfide and the like, phenol compounds such as 2,6-di-t-butyl-4-methylphenol, styrenated phenol and the like, allyl compounds such as allyl alcohol and the like, halogenated hydrocarbon compounds such as dichloromethane, dibromomethane, carbon tetrabromide and the like, vinyl ethers such as α-benzyloxystyrene, α-benzyloxyacrylonitrile, α-benzyloxyacrylamide and the like, and triphenylethane, pentaphenylethane, acrolein, metaacrolein, thioglycolic acid, thiomalic acid, 2-ethylhexyl thioglycolate and the like, and one or more of them may be used.

The use amount of these chain transfer agents is not particularly restricted, and can be appropriately controlled depending on the abilities required for a copolymer latex, and preferably from 0.05 to 10 parts by weight based on 100 parts by weight of a monomer mixture.

As the emulsifier, there can be used one or more of anionic surfactants such as sulfate salts, alkylbenzenesulfonic acid salts, aliphatic sulfonic acid salts, aliphatic carboxylic acid salts of higher alcohols, sulfate salts of nonionic surfactants, and the like, or nonionic surfactants such as alkyl ester types, alkylphenyl ether types, alkyl ether types and the like of polyethylene glycol.

As the polymerization initiator, there can be used, water-soluble initiators such as potassium persulfate, ammonium persulfate, sodium persulfate and the like, redox initiators, or oil-soluble initiators such as benzoyl peroxide and the like.

The copolymer latex of the present invention is compounded as a vehicle with other component for a chipping-resistant paint, and other components are not particularly restricted, and in general, may include fillers such as talc, calcium carbonate, diatomaceous earth, mica, kaolin, barium sulfate, graphite, alumina, iron oxide, titanium oxide, silica, glass balloon, silica balloon and the like, pigments such as carbon black, organic pigments, chromic acid metal salt, phosphoric acid metal salt, metaboric acid metal salt and the like, further, cross-linking agents, curing agents, dispersing agents, thickening agents, organic solvents, antioxidants, ultraviolet absorbers, anti-static agents, heat sensitive gelling agents and the like.

Also, the method of coating a chipping-resistant paint containing a copolymer latex of the present invention as a vehicle, on the metal surface is not particularly restricted, and in general, it can be painted on the metal surface by airless painting method, air spray painting method, brush painting method, roll painting method, spatula painting method and the like.

EXAMPLES

The following examples and comparative examples will illustrate the present invention further specifically for clearly showing the excellent effect of the present invention. The present invention is not limited to these examples. Parts and % shown in examples and comparative examples are by weight unless otherwise stated.

Production of Copolymer Latex

Into a 10 liter autoclave was charged 100 parts of water, 0.3 parts of sodium dodecylbenzenesulfonate, 1.0 part of potassium persulfate, 0.1 part of t-dodecylmercaptane and monomers having a composition shown in the first stage of Table 1, and they were heated up to 65° C. while stirring sufficiently and reacted for 7 hours. Thereafter, monomers having a composition shown in the second stage of Table 1 were continuously added over a period of 1 hour to cause polymerization. Next, they were aged at 75° C. for 5 hours, then, these copolymer latexes were controlled to pH 8 with a sodium hydroxide aqueous solution, and unreacted monomers and the like were removed by water vapor distillation, to obtain a copolymer latex (a). The same operation was conducted except changing to the content shown in Table 1, to produce copolymer latexes (b) to (h). In polymerization of these copolymer latexes (a) to (h), the polymerization conversion based on monomers at the first stage was over 50 wt % at the time of adding monomers of the second stage.

The same operation was conducted without adding monomers of the second stage, to obtain a copolymer latex (i).

Examples 1 to 4 and Comparative Examples 1 to 5

To 100 parts of a copolymer latex (a) was added 70 parts of calcium carbonate, 50 parts of talc, 3 parts of carbon black and 5 parts of barium metaborate, 5 parts by weight of a dispersing agent and 150 parts by weight of water, and they were mixed in a laboratory mixer, to obtain a chipping-resistant aqueous paint of example 1. The resulted chipping-resistant aqueous paint was airless-painted on a turn sheet plate on which lead-tin plating had been applied, so as to give a dry layer thickness of 300 μ. and subjected to setting at room temperature for 10 minutes, then, dried at 80° C. for 10 minutes and at 120° C. for 20 minutes to obtain a sample for evaluation. In a like manner, samples of Examples 2 to 4 were produced using the copolymer latexes (b) to (d) described in Table 1. Further, samples for Comparative Examples 1 to 5 were produced using the copolymer latexes (e) to (i) described in Table 1 in the same manner as in Examples. The above-mentioned parts are based on solid components. The samples in Examples 1 to 4 and Comparative Examples 1 to 5 were evaluated by the following methods.

Strength of Adherence

Strength of adherence was evaluated according to a cross-cut tape method of JIS K5400. That is, on the center part of a coated layer, 11 longitudinal cuttings and 11 transverse cuttings mutually crossing each at 2 mm interval and reaching to the ground of a steel plate were made using a knife, then, a sticky tape was pressed on the cutting parts and peeled directly, and the extent of peeling of the coated membrane was evaluated according to the following standard.

⊚: utterly no peeling
○: area of peeling failure is 5% or less
Δ: area of peeling failure is 5 to 15%
×: area of peeling failure is 15% or more Chipping-Resistance A sample was fixed at an angle of 60° against a horizontal plate, and on the painted surface, nuts (M-4) were continuously fallen from a height of 2 m, and the total weight of fallen nuts when the ground of the turn sheet steel plate was exposed was evaluated according to the following divisions.

⊚: the total weight of nuts is 60 kg or more
○: the total weight of nuts is 50 to 60 kg
Δ: the total weight of nuts is 40 to 50 kg
×: the total weight of nuts is 40 kg or less Water-Resistance Condition after immersion into water of normal temperature for 10 days was checked by a method of JIS K5400.

⊚: no abnormality
○: slight whitening is recognized
Δ: membrane is softened and whitening becomes severe
×: softening and whitening are remarkable and membrane is peeled Cool and Heat Cycle-Resistance A cool and heat-cycle test of 60-cycle repetition of 60° C.×3 hours to −30° C×3 hours was conducted for each sample, and evaluation of cool heat cycle-resistance was effected based on close adherence after completion of test.

TABLE 1

| | | Example | | | | Comparative example | | | | |
|---|---|---|---|---|---|---|---|---|---|---|
| | | 1 | 2 | 3 | 4 | 1 | 2 | 3 | 4 | 5 |
| | | Latex (a) | Latex (b) | Latex (c) | Latex (d) | Latex (e) | Latex (f) | Latex (g) | Latex (h) | Latex (i) |
| First stage (part) | | | | | | | | | | |
| Butadiene | | 50 | 60 | 65 | 55 | 30 | 50 | 50 | 50 | 50 |
| Styrene | | 15 | 12 | 10 | 17 | 15 | 15 | 15 | 5 | 20 |

TABLE 1-continued

|  | Example | | | | Comparative example | | | | |
| --- | --- | --- | --- | --- | --- | --- | --- | --- | --- |
|  | 1 Latex (a) | 2 Latex (b) | 3 Latex (c) | 4 Latex (d) | 1 Latex (e) | 2 Latex (f) | 3 Latex (g) | 4 Latex (h) | 5 Latex (i) |
| Methyl methacrylate | 12 | 10 | 10 | 10 | 12 | 12 | 5 | 12 | 22 |
| β-hydroxyethyl acrylate | 5 | 3 | 1 |  | 5 | 3 | 5 | 5 | 5 |
| Itaconic acid | 1 | 3 | 1.5 | 1.5 | 1 |  | 1 | 1 | 1 |
| Acrylic acid | 1 |  | 1.5 | 1.5 | 1 | 0.5 | 1 | 1 | 1 |
| Fumaric acid | 1 |  | 1 |  | 1 |  | 1 | 1 | 1 |
| Second stage (part) |  |  |  |  |  |  |  |  |  |
| Butadiene |  |  |  |  | 20 |  |  |  |  |
| Styrene | 5 | 6 | 7 | 8 | 5 | 5 | 5 | 15 |  |
| Methyl methacrylate | 10 | 6 | 3 | 7 | 10 | 10 | 17 | 10 |  |
| β-hydroxyethyl acrylate |  |  |  |  |  | 2 |  |  |  |
| Itaconic acid |  |  |  |  |  | 2.5 |  |  |  |
| Property |  |  |  |  |  |  |  |  |  |
| Close adherence | ○ | ◎ | ◎ | ○ | Δ | ○ | ○ | Δ | Δ |
| Chipping-resistance | ◎ | ◎ | ◎ | ◎ | Δ | Δ | ○ | Δ | X |
| Water-resistance | ○ | ◎ | ○ | ◎ | ○ | Δ | Δ | ○ | ○ |
| Cool heat cycle-resistance | ◎ | ◎ | ◎ | ◎ | Δ | Δ | Δ | Δ | X |

◎: utterly no peeling
○: area of peeling failure is 5% or less
Δ: area of peeling failure is 5 to 15%
X: area of peeling failure is 15% or more As described above, by using a copolymer latex made by the method of the present invention for chipping-resistant aqueous paint, balance of chipping-resistance, strength of adherence with metal, and high resistance for cycles of cool and heat can be improved.

What is claimed is:

1. A method for producing a copolymer latex using for chipping-resistant aqueous paint, the method comprising emulsion-polymerizing 20 to 80 parts by weight of a conjugated diene as a monomer, 0.5 to 15 parts by weight of an ethylenically unsaturated carboxylic acid as a monomer, 5 to 40 parts by weight of an aromatic vinyl compound as a monomer, 5 to 40 parts by weight of an unsaturated alkyl carboxylate as a monomer and optionally not more than 69.5 parts by weight of other compound having vinyl group copolymerizable therewith as a monomer based on 100 parts by weight in the total of the monomers, wherein 100 wt % of the amount of conjugated diene, 100 wt % of the amount of ethylenically unsaturated carboxylic acid, 95 to 50 wt % of the amount of aromatic vinyl compound and 95 to 50 wt % of the amount of the unsaturated alkyl carboxylate are added in the former stage of the emulsion-polymerization, and 5 to 50 wt % of the amount of the aromatic vinyl compound and 5 to 50 wt % of the amount of the unsaturated alkyl carboxylate are added at the later stage of emulsion-polymerization.

2. The method for producing a copolymer latex according to claim 1, wherein the aromatic vinyl compound and the unsaturated alkyl carboxylate are added in the later stage when the conversion of the total amount of monomers added in the former stage reaches 30% or more.

* * * * *